Nov. 6, 1951  G. L. RUEG  2,574,291
TELESCOPIC VALVE DEVICE
Filed Aug. 1, 1947  3 Sheets-Sheet 1

INVENTOR
GEORGES L. RUEG
BY Young, Emery & Thompson
ATTYS-

Nov. 6, 1951 G. L. RUEG 2,574,291
TELESCOPIC VALVE DEVICE
Filed Aug. 1, 1947 3 Sheets-Sheet 2

INVENTOR
GEORGES L. RUEG
By Young, Emery & Thompson
ATT'YS.

Nov. 6, 1951     G. L. RUEG     2,574,291
TELESCOPIC VALVE DEVICE
Filed Aug. 1, 1947     3 Sheets-Sheet 3
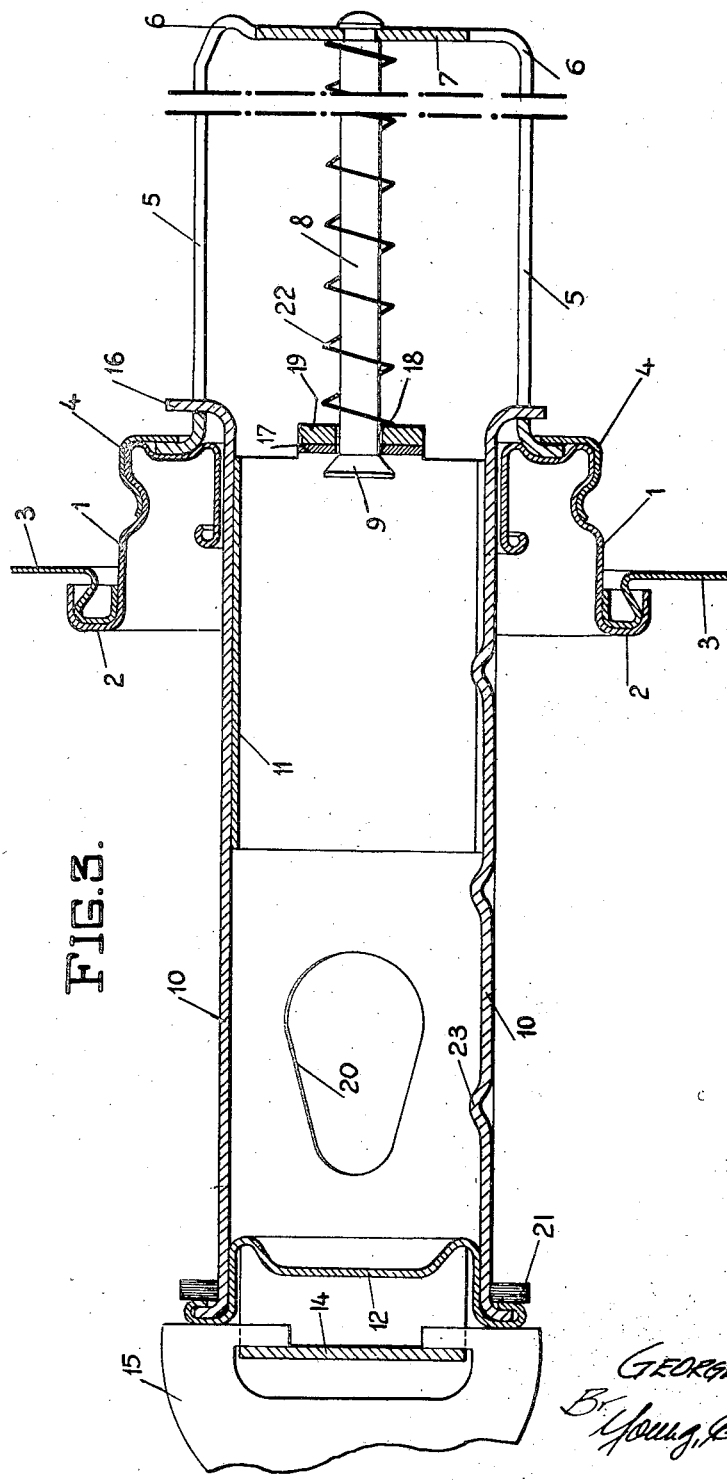
INVENTOR
GEORGES L. RUEG
BY Young, Emery & Thompson Patented Nov. 6, 1951

2,574,291

UNITED STATES PATENT OFFICE 2,574,291

TELESCOPIC VALVE DEVICE

Georges Louis Rueg, Paris, France, assignor to Société Futs Metalliques Gallay, Paris, France, a corporation of the Republic of France Application August 1, 1947, Serial No. 765,528
In France January 24, 1941

Section 1, Public Law 690, August 8, 1946
Patent expires January 24, 1961

4 Claims. (Cl. 251—8)

The present invention has for its object to provide an improved telescopic valve device adapted to be secured to a container such as a barrel before or after the container has been filled, by crimping or any other suitable means.

The improved telescopic valve device comprises two tubes or tube sections slidable with respect to each other without any relative rotational movement, adapted to be completely projected as far as a position flush with the inner part of the securing flange of the valve structure and thus enabling the container to be completely evacuated.

The valve is guided and moved to closed condition by means of a pair of strap members defining together a pair of diametrical grooves wherein external projections provided on the outer tube member are slidable, said projections being adapted to form a bayonet joint between the valve structure and the base of said strap members.

A solid portion interconnecting the ends of the strap members varies axially of the valve structure, an axial rod forming a guide for a coil spring bearing against a cross member carried by the inner tube member, said rod being provided at its top end with a head portion for stopping the slidable tubes in the fully opened condition of the valve.

A packing gland provided between the base of the valve structure and the flange, secured to the container, provides a tight seal when the valve is positively closed against the action of the spring.

According to the invention the valve structure which is adapted to be completely projected from out of the container enables the latter to be completely evacuated. Moreover, means for automatically projecting the tubes as far as one half only of the total stroke of the tubes, after the valve structure has been unlatched, forms a safety device and enables the rate of out-flow to be positively adjusted by pulling out the outer tube more or less far with respect to the blocked inner tube.

The accompanying drawings show by way of example an embodiment of the improved valve structure of the invention.

Figure 1:
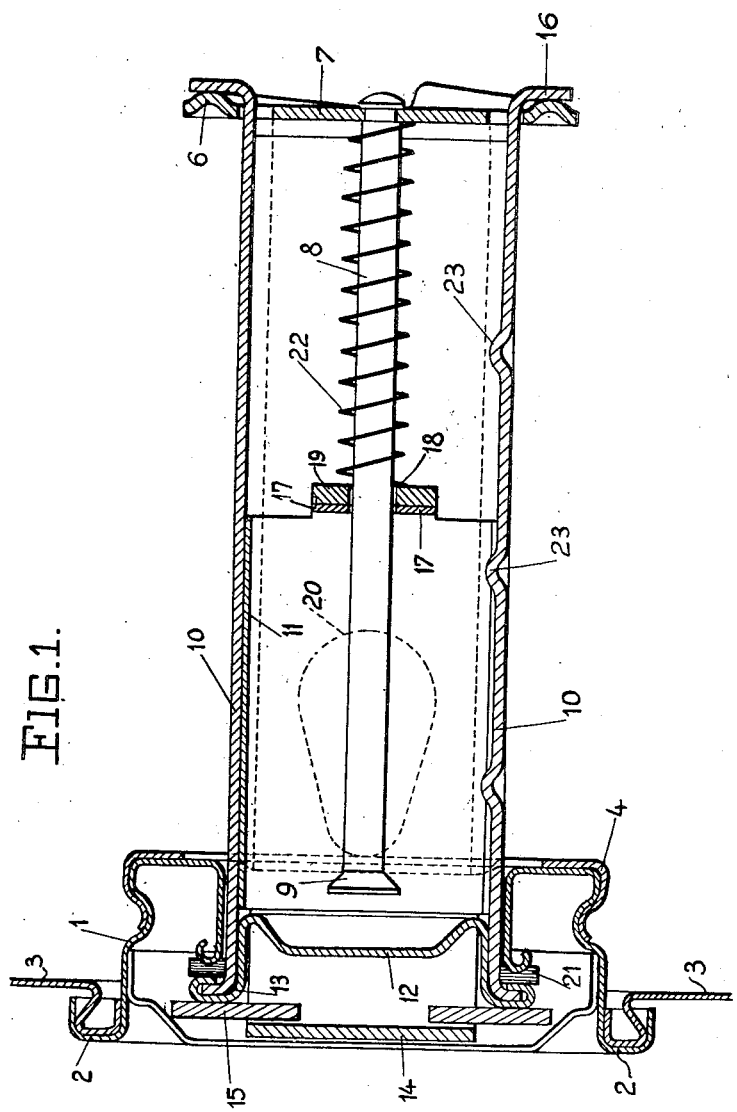
Figure 1 is a longitudinal cross section of the valve assembly in closed and blocked position.

Figure 3 a longitudinal cross section of the valve structure in fully opened condition.

The valve structure comprises a base serving to secure it through its circular rim 2 into a suitable opening formed in the container 3.

Said base 1 has secured thereon by means of the rim or flange 4, strap members 5, 5 defining two longitudinally extending grooves in diametrically opposed relation.

The bases of the straps 5, 5 are formed as circular ramps 6, 6 and provide for the bayonet joint closure of the valve as will be described latter.

Said ramps are interconnected by a solid part 7 carrying along the longitudinal axis of valve structure a rod 8 having an end head portion 9. Said rod 8 has threaded thereon a coil spring 22.

The above described elements of the valve structure form the fixed structure of the valve.

The movable structure adapted to be displaced when operating the valve device is formed by an outer tube member or valve casing 10 slidable in the base 1 and an inner tube member 11.

The outer tube member 10 comprises at its upper end a plug member 12 secured to the edge of said tube with the interposal of a small packing 13, a handle support 14 and a handle 15 for the control of the valve.

An outlet aperture of suitable form 20 is provided through the wall of the tube 10 for the outflow of the liquid.

Said tube 10 is provided throughout its length with small internally projecting bosses 23, 23 engaging a longitudinal groove formed in the inner tube 11 and preventing any relative rotation of both said tubes.

The end of the tube 10 comprises two diametrically arranged outward projections 16, 16 engaging the grooves defined by the strap members 5, 5.

A packing 21 is provided between the bent edge of the plug member 12 and the base 1.

The longitudinal groove in the inner tube 11 imparts to the latter a certain amount of resiliency adapted to ensure a tight seal between said tube and the tube 10.

Said inner tube 11 carries at its inner end a cross member 17 formed with a central hole 18 through which extends the axial rod 8. One end of the spring 22 is seated on said cross member with the interposal of washer 19.

The valve device operates as follows:

In closed and blocked condition (Fig. 1) the projections 16, 16 of the tube member 10 engage the ramps 6, 6 of the strap 5, 5 and maintain the valve in closed condition against the action of the spring 22, the packing 21 being tightly clamped between the base 1 and the plug 12.

Figure 2:
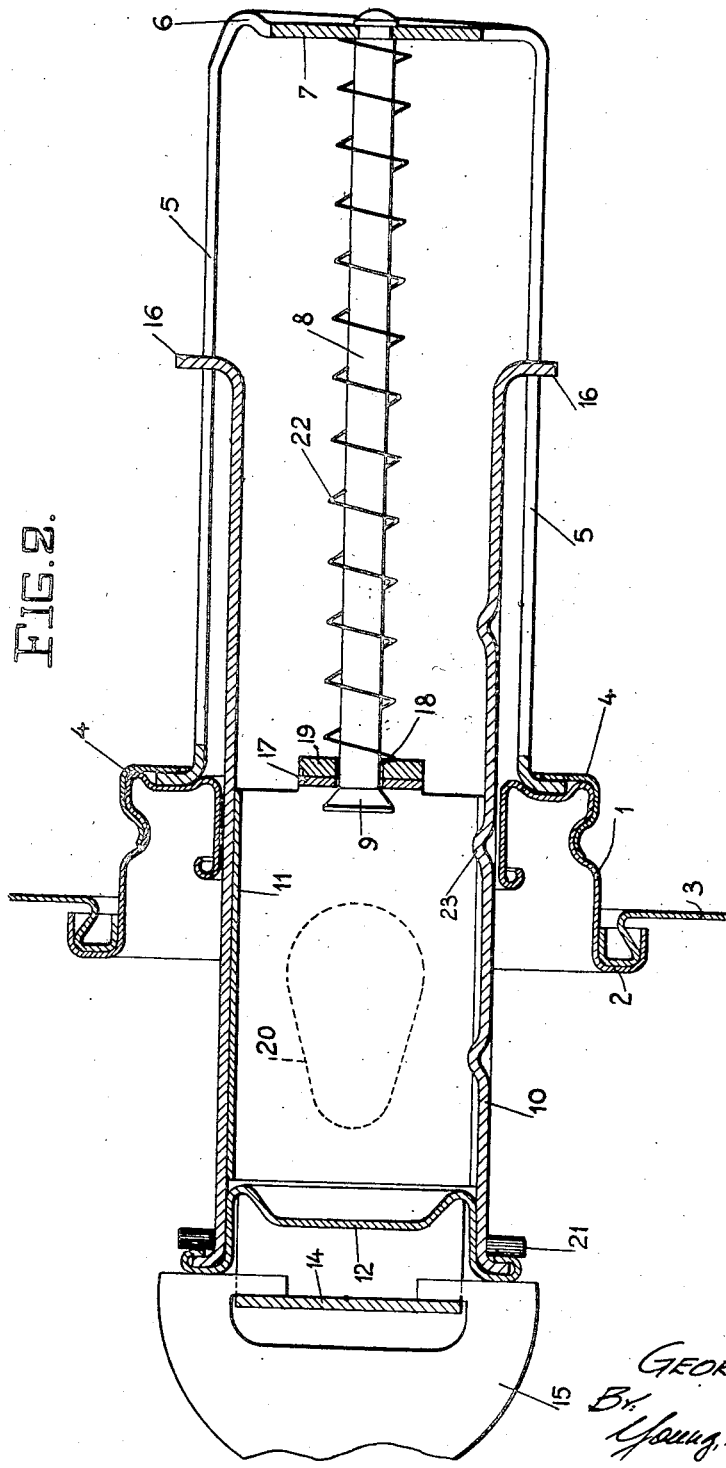
Figure 2 shows a longitudinal cross section on a perpendicular plane, the valve assembly being in half opened condition.

To unlatch and open the valve; it is simply necessary to rotate through 90° the assembly comprising both tubes 10 and 11 by means of the actuating handle 15. The projections 16 then being clear of the ramps 6, 6, the spring 22 expands and ejects the assembly including both tubes as far as a position corresponding to a half-opened condition of the valve (Fig. 2).

The limit for this ejecting movement is provided by the cross member 17 which abuts against the head 9 of the rod 8. The inner tube 11 is thus at the end of its stroke but its side wall maintains the outlet aperture 20 in the tube 10 in sealed condition.

To complete the opening, it simply remains to exert a pull on the actuating member 15; the tube 10 then slides with respect to the tube 11 which is blocked and progressively clears its aperture 20 through which it is thus possible to control and regulate the rate of flow (Fig.3), until the projections 16 engage the bottom of the grooves defined by the strape 5.

Closure and blocking of the valve are effected by means of a reverse procedure to that described.

It will of course be understood that the above described embodiment is in no way restrictive and may be subjected to any suitable contructional modifications without exceeding the scope of the invention.

What is claimed is:

1. A valve device, comprising in combination a valve-base element provided with an aperture and on one inner side with guiding means normal to said aperture, an external tube member slidable outwardly along said guiding means through said aperture, having an open inner end, a sealed outer end, and an outlet in its side wall near said outer end, an internal tube member of lesser length than said external tube and slidable therein to cover and uncover said outlet, an abutment on the inner end of the internal tube, a fixed stop for said abutment, internal to said tubes and close to said aperture, a spring urging said internal tube towards the sealed end of said external tube in closed relation to said outlet, sealing means between the outer end of said external tube and said apertured element, means for clamping said external tube in sealed retracted position against said spring and means for handling said external tube, whereby, after the external tube has been unclamped, the spring may urge the tubes to a partly extended position where said abutment is in contact with said stop, said outlet being on the outer side of said apertured element and kept closed by the internal tube, and the said outlet may be opened in a controllable manner by pulling said external tube outwardly on said stopped internal tube.

2. A valve device, comprising in combination a valve-base element provided with an aperture and on one inner side with strap members defining guiding grooves normal to said aperture and forming circular ramps at the inner end of said grooves, a bridge portion between said straps holding an axial extending rod provided with a head at its outer end close to said aperture, an external tube member slidable outwardly through said aperture, having an open inner end formed with outward projections engaging said grooves, a sealed outer end provided with an outwardly extending collar and with a packing and a handle, and an outlet in its side wall near said outer end, an internal tube member of lesser length than said external tube and slidable therein to cover or uncover said outlet, provided at its inner end with a cross member sliding on said rod and forming an abutment for the said head thereof, and a spring between said bridge portion and said abutment urging said internal tube toward the sealed end of said external tube in closed relation to said outlet, whereby the external tube may be latched in retracted position against said spring in sealed relation between its collar and the base element by rotation of the handle forcing its projections on said ramps at the inner end of said grooves, the external tube when unclamped may be urged by the spring together with the internal tube in a partly extended position in covering relation of its outlet with the internal tube, and may be pulled further on said stopped internal tube to discover said outlet in a controllable manner.

3. A valve device as claimed in claim 2 wherein said outlet is of an elongated from increasing in width from its outer to its inner end.

4. A valve device as claimed in claim 2, including as said internal tube a longitudinally cut sleeve resiliently fitting in said external tube and inwardly directed projections formed in the wall of the latter along a generatrix thereof and adapted to engage said cut portion of said sleeve.

GEORGES LOUIS RUEG.

REFERENCES CITED

The following references are of record in the file of this patent:

UNITED STATES PATENTS

| Number | Name | Date |
|---|---|---|
| 648,455 | Farson | May 1, 1900 |
| 1,006,332 | Wilson | Oct. 17, 1911 |
| 1,132,175 | Filczer | Mar. 16, 1915 |

FOREIGN PATENTS

| Number | Country | Date |
|---|---|---|
| 689,990 | France | 1930 |